Dec. 2, 1930.  F. B. EILERS  1,783,916
LIQUID DISPENSING APPARATUS
Filed Jan. 14, 1929  4 Sheets-Sheet 1

Frank B. Eilers INVENTOR
BY
A. G. Burns ATTORNEY

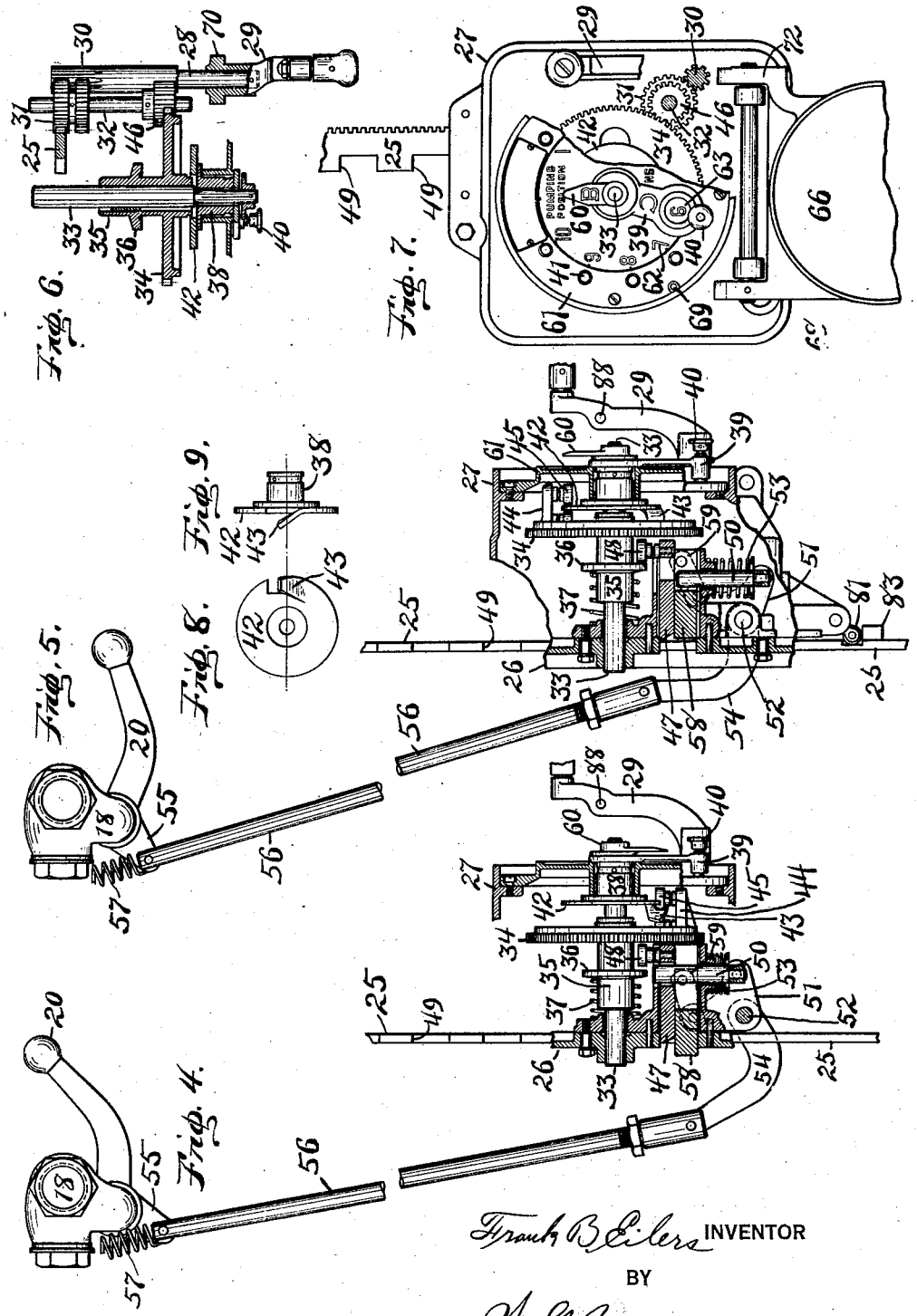

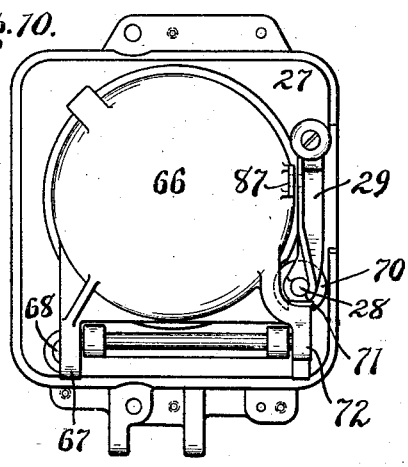
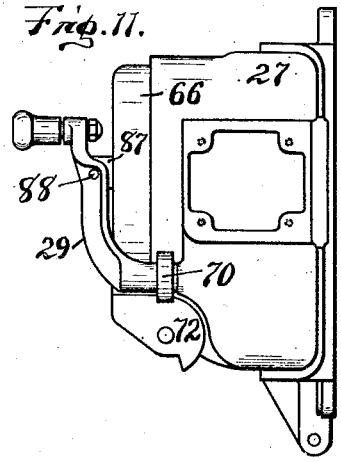
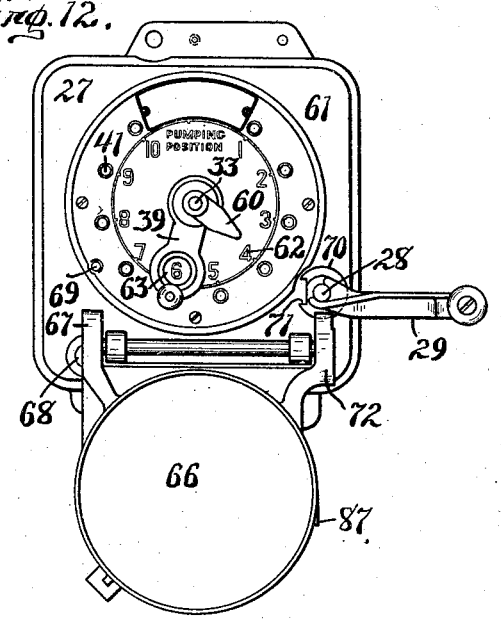
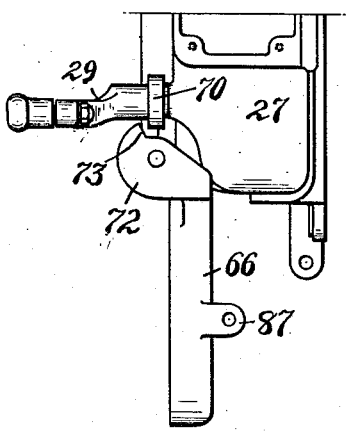

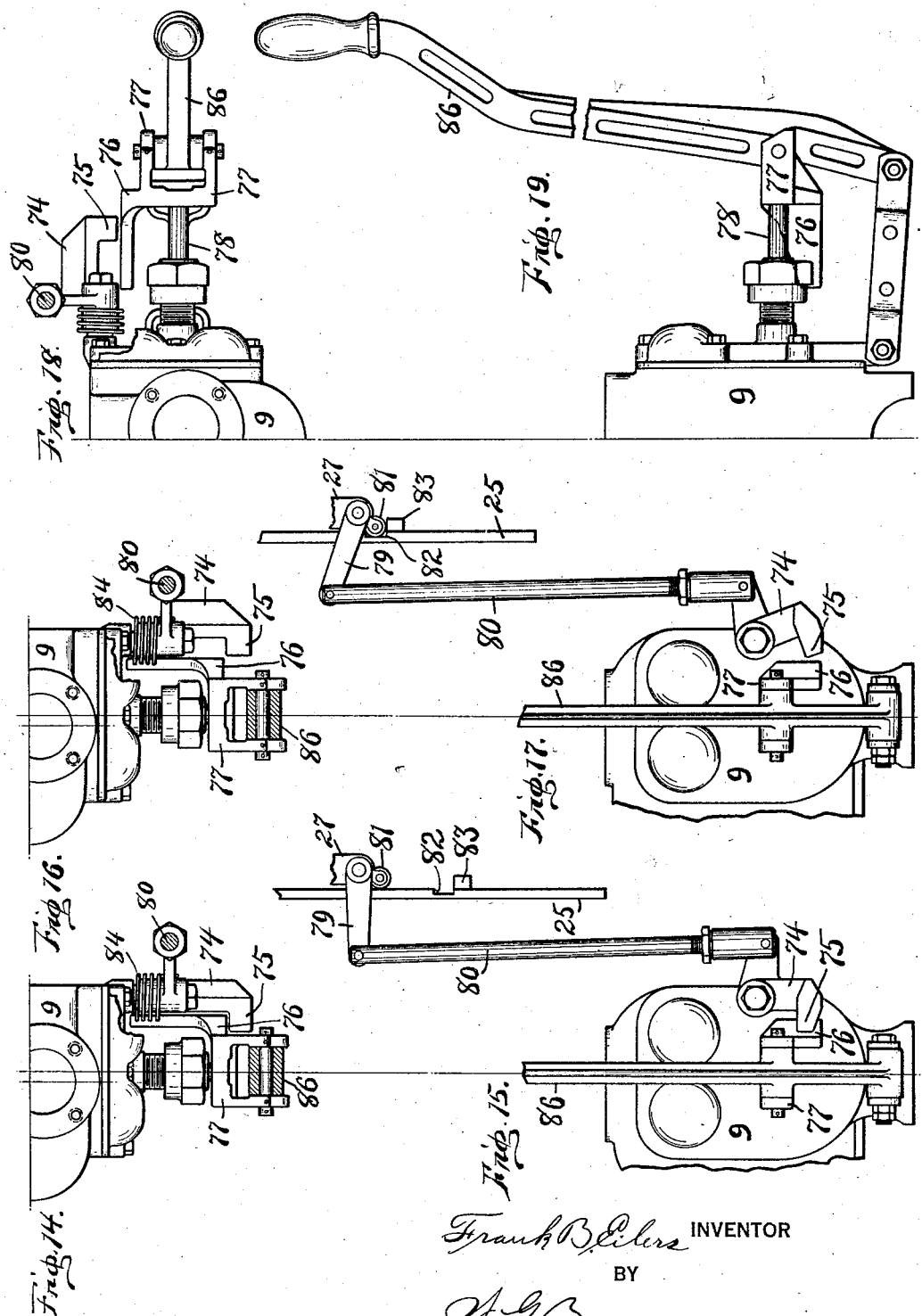

Patented Dec. 2, 1930

1,783,916

UNITED STATES PATENT OFFICE

FRANK B. EILERS, OF FORT WAYNE, INDIANA, ASSIGNOR TO TOKHEIM OIL TANK AND PUMP COMPANY, A CORPORATION OF INDIANA

LIQUID-DISPENSING APPARATUS

Application filed January 14, 1929. Serial No. 332,267.

This invention relates to improvements in liquid dispensing apparatus of that type generally employed at filling stations for vending gasoline in measured quantities.

The objects of the improvement contemplate the embodiment in an apparatus for dispensing liquid, a display vessel, a mechanism for filling the vessel with liquid, a dispensing means for withdrawing the liquid from the vessel in precisely measured predetermined amounts, and also a means for draining the display vessel, all of which are so related with each other that the filling, dispensing and draining operations may only be performed separately at different times. Another object of the invention is to provide a locking means of similar form whereby unauthorized filling of the vessel and operation of the dispensing means are prevented.

The dispensing means employed in the present invention includes a sliding tube that is moved vertically in the display vessel such as are commonly used for withdrawing different quantities of the liquid from the measure by adjustments thereof at different points below the overflow level of the liquid. In the present instance one of the objects of the invention is to provide means for accurately positioning and holding the tube in its various positions of adjustment.

These objects are accomplished by the construction illustrated in the accompanying drawings, in which:—

Fig. 1 is a front elevation of a structure embodying the invention, portions thereof being broken away;

Fig. 2 is a fragmentary side elevation projected from Fig. 1, a portion being broken away;

Fig. 3 is a similar view displaying the opposite side from that of Fig. 2;

Fig. 4 is a side elevation of the mechanism for controlling the dispensing valve and the discharge tube, parts being in section and the valve being in open position;

Fig. 5 is a similar view with the dispensing valve in closed position;

Fig. 6 is a plan view of the actuating mechanism for the discharge tube, portions being in section;

Fig. 7 is a front elevation of the operating mechanism for the discharge tube, and housing therefor, portions being broken away;

Fig. 8 is a front elevation of the cam for the discharge tube adjusting means;

Fig. 9 is a side elevation projected from Fig. 8;

Fig. 10 is a front elevation of the housing for the controlling means for the dispensing mechanism, shown in closed position;

Fig. 11 is a side elevation projected from Fig. 10;

Fig. 12 is a front elevation of the controlling means and housing therefor in open position;

Fig. 13 is a fragmentary side elevation projected from Fig. 12;

Fig. 14 is a fragmentary plan view of the pump and the locking means therefor, in engaging position;

Fig. 15 is a front elevation projected from Fig. 14;

Fig. 16 is a fragmentary plan view of the pump and locking means therefor in unlocked position;

Fig. 17 is a front elevation projected from Fig. 16;

Fig. 18 is a fragmentary plan view of the pump and locking means therefor in unlocked position; and Fig. 19 is a side elevation projected from Fig. 18.

The invention comprises a dispenser having a transparent vessel 1 for receiving and displaying liquid, the vessel being mounted upon a pedestal 2 and surmounted by a dome 3, which vessel is encompassed by a metallic netting 4.

The capitol 5 of the pedestal is supported on posts 6 that extend upward from the base 7, and said posts afford a support also for a horizontal platform 8 upon which is mounted a pump 9.

The vessel 1 is filled through a supply pipe 10 that extends from the pump 9 and up into the vessel through its base 11, and an overflow pipe 12 is screwed into the base 11 and has constant communication with a return flow pipe 13 through a connection 14 that is secured to the bottom of the base 11. The vessel is provided with a drain valve 15, which valve is related with the connection 14 so that when said drain valve is opened, the liquid contents of the vessel is drained therefrom into the return flow pipe 13.

In the dispensing operation, the liquid is withdrawn from the vessel 1 through a vertically adjustable gauge tube 16 which extends into a sump 17 that depends from the bottom of the vessel. The liquid passing through said tube into the sump is discharged therefrom through a dispensing valve 18 provided with a discharge pipe 19 and operating lever 20. The gauge tube 16 has an actuating rod 21 that extends through a stuffing box 22 in the bottom of the sump, said rod being connected with a cross-head 23 which slides vertically upon a guide rod 24. The quantity of liquid discharged from the vessel upon each dispensing operation is selective, increasing as the gauge tube is lowered in the vessel, and is regulated by the vertical adjustment of the tube accordingly, in a manner similar to that in the liquid dispensing apparatus set forth in my previous application, Serial Number 131,583.

A vertically movable rack-bar 25 has fixed connection at its lower end with the cross head 23 and has guided sliding movement in a stationary base 26, that is fixed within the pedestal.

One of the novel features of the invention consists of the actuating mechanism for the rack-bar, and the manner in which the downward movement thereof is limited at predetermined stages. The actuating mechanism for said rack-bar is mounted in connection with a housing 27 that is supported on the base 26 and projects through the adjacent wall of the pedestal 2. A crank-shaft 28 is mounted in the housing, its outer end being provided with an operating crank 29 and its inner end being toothed to form a pinion 30, which pinion has operating relation with the rack-bar 25 through an intermediate gear 31 that is fixed upon a countershaft 32, the latter being rotatably mounted in the housing 27. As the crank 29 is turned in one direction or the other, the rack-bar is raised or lowered accordingly.

The rack-bar is limited in its downward movement by a mechanism consisting of a shaft 33 rotatably mounted in the housing in a position parallel with the countershaft 32, upon which shaft is mounted a gear 34, the hub 35 of which has splined relation with the shaft 33. The hub 35 has also a collar 36, and an expansion spring 37 is disposed around the inner end of the hub between said collar and the inner wall of the housing, and tends to hold the gear 34 in its forwardmost position on the shaft 33. In the front end of the housing 27 is rotatably mounted a sleeve 38 through which the shaft 33 loosely extends in axial alinement therewith, and said sleeve is provided with an operating lever 39 by which said sleeve is rotatably adjusted. The operating lever is provided with a stop 40, the inner end of which is engageable selectively in holes 41 formed in an annular series in the front of the housing 27, so that said sleeve is thereby held in any predetermined position of adjustment. Upon the inner end of the sleeve 38 (Figs. 8 and 9) is concentrically fixed a disc 42, one portion of the perimeter thereof being bent out of the general plane of the disc to form a cam 43. From the forward end of the gear 34 there projects a bracket 44 having thereon a pair of rollers 45 between which rollers the perimeter of the disc 42 extends, and with which rollers the cam 43 is operatively related so that when the gear 34 is rotated to that point where the rollers reach and are engaged by the cam 43, said gear 34 is moved rearwardly upon the shaft 33 in opposition to the action of the spring 37. The gear 34 meshes with a pinion 46 (Figs. 6 and 7) that is fixed on the shaft 32, and is rotated thereby proportionately as the rack-bar 25 is actuated by the intermediate gear 31. Thus, the gear 34 is operatively related with said rack-bar with respect to its rotary movement, and is operatively related with respect to its longitudinal movement on the shaft 33, with the cam 43. The longitudinal movement of the gear wheel 34 takes place at such stage in the cycle of its operation as may be predetermined by adjustably positioning the cam 43 which is accomplished by manipulation of the lever 39.

Within the housing is slidably positioned an apertured lock-bar 47 (Figs. 4 and 5) having mounted thereon a roller 48 that projects upwardly between the gear 34 and the flange 36 on the hub thereof, so that as said gear is moved longitudinally, said lock-bar 47 is actuated accordingly. The forward end of the lock-bar 47 when moved rearwardly enters one or the other of the notches 49 made in the rear edge of the rack-bar 25, and arrests downward movement of said rack-bar at a corresponding stage of its stroke. The spacing of the notches 49 in the rack-bar and that of the stop-holes 41 in the front of the housing, are such that when the cam 43 is set in any one of its adjusted positions, the lock-bar 47 will be moved into a corresponding one of the notches 49 in said rack-bar (Fig. 4). Thus, by adjustably positioning the operating lever 39 and turning the operating crank 29, the rack-bar is lowered to a point where it is arrested by the lock-bar, which point is predetermined by the adjustment of the operating lever 39.

Beneath the lock-bar 47 is disposed a vertically movable bolt 50 that is operatively related with the lock-bar 47, which bolt, by projecting into the aperture of said lock-bar when the latter is in locking position, prevents withdrawal of the lock-bar from locking engagement with the rack-bar (Fig. 4). Also, when said lock-bar is out of locking position (Fig. 5), and the rack-bar is disengaged therefrom, the aperture in said lock-bar is out of alinement with the bolt 50. Thus, upward movement of said bolt 50 is obstructed by the lock-bar. The lower end of the bolt 50 has pivotal connection with a bell-crank 51 which is fixed upon a transversely disposed rock-shaft 52 mounted in the housing, whereby vertical movement is imparted to the bolt accordingly as said shaft is actuated, there being a compression spring 53 acting to hold said bolt in disengaging position. The shaft 52 has fixed thereon an operating arm 54 which is operatively connected with an operating arm 55 on the dispensing valve 18 by means of a coupling rod 56, there being a tension spring 57 applied so as to normally hold the dispensing valve in closed position. In this manner, when the rack-bar 25 is disengaged by the lock-bar 47, the upward movement of the bolt 53 and rocking movement of the shaft 52 are thereby obstructed, and thus opening of the dispensing valve is prevented.

As a means to prevent premature opening of the dispensing valve, or until the rack-bar is arrested by the lock-bar, a sliding stop block 58 is disposed immediately beneath the lock-bar 47, the forward end of said block being slotted so as to afford clearance for the bolt 50. The stop block 58 is operatively connected with the bell-crank 51 by means of a link 59 which is pivoted respectively thereto, so that when the rock-shaft is actuated, said block is moved accordingly. The notches 49 in the rack-bar 25 are each so proportioned as to receive and to no more than accommodate the lock-bar 47 and the block 58 at the same time, and thus, rearward movement of said block is obstructed by the rack-bar and opening of the dispensing valve is thereby prevented until one or the other of the notches 49 in the rack-bar is positioned to receive both the lock-bar and the block. In this manner the dispensing operation of the apparatus may be performed only when the rack-bar is set precisely in one or the other of its definite positions of adjustment.

As a means of determining the stage of movement of the sliding tube 16, which is actuated through its connection with the rack-bar 25, a pointer 60 is fixed on the front end of the shaft 33 so that as the rack-bar is actuated and said shaft 33 is consequently rotated, the pointer is accordingly turned through a corresponding course over the front of the housing where it may be observed.

The front end of the housing has formed thereon a circular dial 61 having the annular series of stop holes 41 therein, and upon which are also disposed an annular series of characters 62 corresponding with said stop holes, over which characters the operating lever 39 extends, there being an opening 63 in said lever through which said characters are singly observable accordingly as said lever is adjustably positioned. In this manner, by positioning the lever at any one of its various points of adjustment, the operator is apprised of the quantity of liquid that will be discharged in the subsequent dispensing operation, and also, by means of the pointer is apprised of the stages of progression of the adjusting operation.

As a means to prevent draining of the vessel simultaneously with the dispensing operation a T-shaped lever 64 is pivotally supported upon the base 26 back of the housing and is operatively connected with the drain valve 15 by means of a coupling rod 65, so that as said lever is tilted in one direction or the other, the drain valve is closed or opened accordingly.

Upon the front of the housing is hinged a door 66 disposed so as to swing downwardly, and shaped so as to cover the dial 61 when closed, and also conceal the operating lever 39 and pointer 60. One hinge member 67 of said door is in the form of a cam, and a push-rod 68 is pivotally connected at its inner end to said T-shaped lever 64, and projects through the front of the housing so as to bear against said hinge member 67 and be moved inwardly thereby when the door is opened, and thus cause said drain-valve to close. Another push-rod 69 is pivotally connected at its inner end to said lever 64 at a point thereon opposite the connection of the other push-rod, with respect to the axis of said lever. The forward end of the push-rod 69 also extends through the front of the housing and is moved inwardly by the door as it is closed, whereupon said drain-valve is thereby opened.

As a means to prevent opening of the drain-valve during dispensing operations, the operating crank 29 is provided with a hub flange 70 having therein a slot 71, into which the adjacent hinge member 72 is receivable when the crank 29 is disposed in its uppermost position (Figs. 10 and 11), and the door is moved from its open position, said hinge member 72 having an offset 73 made therein so located as to afford clearance for said flange 70 only when the door is in open position and thus permit operation of the crank 29. Thus, closing of the door and consequent opening of the drain-valve are prevented when the crank 29 is in any other than its uppermost position.

The crank 29 and gearing operated thereby are so related with the rack-bar 25 and the lock-bar 47 that the rack-bar is arrested by said lock-bar only at such points when the operating crank 29 is in other than vertical position, and opening of the dispensing valve is prevented because of the obstruction of the bolt 50 by the lock-bar 47 when in disengaging position, and also by the stop-block until said block is unobstructed by the rack-bar 25. In this manner the closing of the door or partial closing thereof, and consequent opening of the drain-valve, and simultaneous opening of the dispensing valve are prevented, and thus fraudulent diversion of liquid from the display vessel through the drain-valve into the return flow pipe, during the dispensing operation is obviated.

As a means to prevent fraudulently supplying liquid to the display vessel during the dispensing operation, a locking mechanism (Figs. 14 to 19 inclusive) is provided, which mechanism consists of a rocker 74 pivotally mounted on the pump 9, said rocker having a lug 75 that has locking engagement with an arm 76 that is fixed on the side of the cross-head 77 of the pump rod 78, and which extends rearwardly therefrom. When the pump rod is in its innermost position and the rocker is turned to its locking position, the lug 75 projects into the path of the arm 76 and thereby obstructs outward movement of the cross-head and operation of the pump. When the rocker is in its opposite position, the lug 75 is disposed out of the path of the arm 76 so that operation of the pump is permitted. Also, when the pump rod is in other than its innermost position (Fig. 18), said arm 76 is then disposed in the path of the lug 75 so as to prevent operation of said rocker. A bell-crank 79 is pivotally mounted in connection with the housing 27, one arm of which bell-crank is operatively connected with said rocker 74 by means of a coupling rod 80, and a roller 81 is mounted in said bell-crank and bears against one face of the rack-bar 25 so that said rocker is thereby held out of its locking position. The rack-bar 25 has made therein a recess 82, and has a stop block 83 fixed thereon at the lower end of said notch. When the rack-bar 25 is raised to its uppermost position, said roller is receivable into the notch 82 and enters therein, there being a torsional spring 84 on said rocker that tends to move it into locking position when such action is permitted by engagement with said roller in the notch. In this manner operation of the pump when the rack-bar and the discharge tube 10 operatively related therewith, are in any other than their uppermost positions, and also lowering of the sliding discharge tube from its uppermost position during operation of the pump is prevented.

In utilizing the invention the suction pipe 85 of the pump 9 is connected with a source of supply of gasoline, such as an underground tank (not shown), and the return flow pipe 13 is also connected with said tank in the usual manner.

To operate the apparatus, the door 66 is swung downwardly to its open position, whereupon the operating lever 39 and pointer 60 are exposed to view, and automatically the operating crank 29 is released from locked engagement with the hinge member 72 of said door, and the drain valve is closed. The crank 29 is then turned so as to elevate the sliding tube 10 to its uppermost position, whereupon the roller 81 enters the slot 82 in the rack-bar 25 which permits the rocker 74 to turn out of locking position. The display vessel is then filled to the top of the overflow pipe 12 by operating the pump, which is provided with a handle 86 for actuating it. Any surplus gasoline passing into the vessel is eliminated by gravitation through the overflow pipe 12 and return flow pipe 13 through which said surplus passes into the underground tank. The operating lever 39 is then turned to one of its several positions of adjustment according to the quantity of gasoline to be discharged, during the dispensing operation, as may be predetermined, the characters 62 designating such amounts and the corresponding positions of adjustment for said lever. The crank 29 is then turned so as to lower the sliding tube to the point where limited by the lock-bar 47 which is projected into one of the notches 49 in the rack-bar corresponding to the position in which the lever 39 is adjusted. At this stage of the operation, the lever 20 may be raised and the dispensing valve thereby opened which permits that portion of the gasoline in the display vessel above the sliding tube, to gravitate through said tube into the sump 17 and from thence out through the dispensing valve 18 and discharge pipe 19, the other portion of the gasoline in the vessel being retained therein. While the dispensing valve is held in open position, the lock-bar 47 and stop block 58 project into one of the notches 49 in the rack-bar which prevent movement of said rack-bar, and also said lock-bar is prevented from disengagement therewith because of the bolt 59 which projects into the aperture of said lock-bar. Thus, an interlocking relation is established between the dispensing valve and the sliding discharge tube, whereby one is rendered inoperative upon operation of the other and vice versa. The vessel is refilled by first elevating the sliding tube to its uppermost position to permit operation of the pump and a repetition of the dispensing operation.

To place the apparatus out of service, the crank 29 is turned to its uppermost position, and the door is then closed, whereupon the drain valve is automatically opened and the vessel thereby emptied, the crank 29 is locked by the hinge member 72, and the operating lever 39 and the pointer 60 are confined.

To prevent unauthorized opening of the door 66, any suitable means may be employed for locking same in closed position. For instance, a perforated lug 87 that projects from one side of the door adjacent the crank 29 and alined with a perforation 88 therein, is provided so that an ordinary padlock (not shown), may be applied to the lug and the crank with its staple inserted through the perforations therein.

What I claim is:—

1. In liquid dispensing apparatus, a liquid display vessel; a filling means therefor; a discharge means including a vertically sliding tube and a dispensing valve related therewith through which liquid is dispensed from said vessel; a rack-bar operatively related with said sliding tube, having a series of notches made therein; an apertured lock-bar engageable in said notches selectively to arrest downward movement of said rack-bar; an adjustment including actuating means therefor, operatively related with said rack-bar; a rotatable and longitudinally movable member rotatably actuated by said adjustment and operatively related with said lock-bar with respect to the longitudinal movement of said member; a cam including means for adjustably positioning it, which cam has operative relation with said member respecting longitudinal movement thereof; an indicator operatively related with said member respecting rotary movement thereof; a stop-block having interlocking relation with said rack-bar; a lock-bolt having interlocking relation with said lock-bar; a mechanism operatively related with said stop-block and bolt; a discharge lever operatively related with said dispensing valve and mechanism; and an interlocking mechanism related with the rack-bar and said filling means whereby operation of the rack-bar is prevented during operation of the filling means and vice versa.

2. In liquid dispensing apparatus, a liquid display vessel; a filling means therefor; a discharge means including a vertically sliding tube and a dispensing valve related therewith through which liquid is dispensed from said vessel; a rack-bar operatively related with said sliding tube, having a series of notches made therein; an apertured lock-bar engageable in said notches selectively to arrest downward movement of said rack-bar; an adjustment having actuating means therefor, operatively related with said rack-bar; a rotatable and longitudinally movable member rotatably actuated by said adjustment and operatively related with said lock-bar with respect to the longitudinal movement of said member; a cam including means for adjustably positioning it, which cam has operative relation with said member respecting longitudinal movement thereof; an indicator operatively related with said member respecting rotary movement thereof; a stop-block having interlocking relation with said rack-bar; a lock bolt having interlocking relation with said lock-bar; a mechanism operatively related with said stop block and bolt; and a discharge lever operatively related with said dispensing valve and mechanism.

3. In liquid dispensing apparatus, a liquid display vessel; a filling means therefor; a discharge means including a vertically sliding tube and a dispensing valve related therewith through which liquid is dispensed from said vessel; a rack-bar operatively related with said sliding tube, having a series of notches made therein; an apertured lock-bar engageable in said notches selectively to arrest downward movement of said rack-bar; an adjustment having actuating means therefor, operatively related with said rack-bar; a rotatable and longitudinally movable member rotatably actuated by said adjustment and operatively related with said lock-bar with respect to the longitudinal movement of said member; a cam including means for adjustably positioning it, which cam has operative relation with said member respecting longitudinal movement thereof; a stop-block having interlocking relation with said rack-bar; a lock bolt having interlocking relation with said lock-bar; a mechanism operatively related with said stop block and bolt; and a discharge lever operatively related with said dispensing valve and mechanism.

4. In dispensing apparatus, a liquid display vessel; a filling means therefor; a discharge means including a sliding tube and valve related therewith through which liquid is dispensed from said vessel; a rack-bar operatively related with said sliding tube; a lock-bar for arresting movement of said rack-bar; an adjustment having actuating means therefor; a rotatable and longitudinally movable member rotatably actuated by said adjustment and operatively related with said lock-bar with respect to the longitudinal movement of said member; a cam including means for adjustably positioning it, which cam has operative relation with said member respecting longitudinal movement thereof; an operating lever for said dispensing valve; and an interlocking mechanism related with said lock-bar and lever whereby operation of said rack-bar is prevented when said dispensing valve is opened, and opening of said dispensing valve is prevented during movement of said rack-bar.

5. In dispensing apparatus, a liquid display vessel; a filling means therefor; adjustable discharge means for dispensing liquid in predetermined quantities from said vessel; an adjustment for said discharge means; a rotatable and longitudinally movable member rotated by said adjustment; an indicator operatively related with said member respecting rotary movement thereof; an adjusting means operatively related with said member respecting longitudinal movement thereof; and interlocking mechanism related with said member and discharge means whereby adjustment of said discharge means during the discharge of liquid therethrough is prevented.

6. In dispensing apparatus, a liquid display vessel; a filling means therefor; adjustable discharge means for dispensing liquid in predetermined quantities from said vessel; an adjustment for said discharge means; a rotatable and longitudinally movable member rotated by said adjustment; an adjustable means operatively related with said member respecting longitudinal movement thereof; and interlocking mechanism related with said member and discharge means whereby adjustment of said discharge means during the discharge of liquid therethrough is prevented.

7. In dispensing apparatus, a liquid display vessel; a filling means therefor; an adjustable sliding tube through which liquid is discharged from said vessel; means including a dispensing valve controlling the discharge from said tube; an adjustment for said tube; a rotatable mechanism actuated longitudinally by said adjustment operatively related with said discharge tube for limiting movement thereof; an interlocking mechanism related with said dispensing valve and sliding tube whereby opening of the dispensing valve and movement of the sliding tube and movement of said sliding tube when said dispensing valve is open are prevented; and another interlocking mechanism related with said sliding tube and said filling means whereby operation of said filling means during movement of said tube, and movement of said tube during operation of said filling means are prevented.

8. In dispensing apparatus, a liquid display vessel; a filling means therefor; an adjustable sliding tube through which liquid is discharged from said vessel; means including a dispensing valve controlling the discharge from said tube; an adjustment for said tube; a rotatable mechanism actuated longitudinally by said adjustment operatively related with said discharge tube for limiting movement thereof; and interlocking mechanism related with said dispensing valve and sliding tube whereby opening of the dispensing valve and movement of the sliding tube, and movement of said sliding tube when said dispensing valve is open are prevented.

9. In liquid dispensing apparatus having a display vessel and dispensing means including an adjustable discharge tube in said vessel; adjusting means operatively related with said tube; a mechanism for limiting movement of said tube including operating means therefor; a locking mechanism related with said tube for holding it in its several positions of adjustment and related also with said dispensing means whereby the discharge through said dispensing means is prevented during movement of said tube; a drain-valve for said vessel; a door confining said operating means; and a mechanism related with the door and drain-valve whereby the drain-valve is automatically opened and closed accordingly when the door is closed or opened, said door and adjusting means having interlocking relation whereby operation of said adjusting means is prevented when the door is closed, and closing of the door is prevented during discharge through said dispensing means.

In testimony whereof I affix my signature.

FRANK B. EILERS.